SPUTTERING PROCESS FOR PREPARING STABLE
THIN FILM RESISTORS
Filed May 8, 1969

INVENTOR.
EMANUEL STERN

BY

ATTORNEY 3,591,479
SPUTTERING PROCESS FOR PREPARING STABLE THIN FILM RESISTORS

Emanuel Stern, Mount Kisco, N.Y., assignor to International Business Machines Corporation, Armonk, N.Y.

Filed May 8, 1969, Ser. No. 823,063
Int. Cl. C23c *15/00*
U.S. Cl. 204—192 6 Claims

ABSTRACT OF THE DISCLOSURE

Thin film resistors which are stable to thermal and electrical stress are prepared. A metal alloy is deposited onto a substrate in a sputtering atmosphere comprised of a pre-determined mixture of argon and oxygen. A DC bias potential in a range of −70 to −250 volts is applied to the substrate during the sputtering operation.

BACKGROUND OF THE INVENTION

Field of the invention

This invention relates generally to sputtering processes for depositing thin films, more particularly, to the fabrication by such processes of thin film resistors elements having reproducible and stable characteristics. In its particular aspect, this invention includes the capability of depositing thin film resistors which are stable to thermal and electrical stress in a single operation.

Description of the prior art

Presently, industry is developing an integrated circuit technology whereby large numbers of circuit components, both active and passive, are formed on a same supporting substrate. Such substrate may be formed, for example, of semiconductor materials and comprise an intricate part of the active and/or passive circuit components. Generally, resistor elements suitable for integrated circuits have been formed on a substrate either as thin metallic film and/or as controlled diffusions of predetermined geometries to exhibit a desired resistance. Thin film resistor elements are preferred since they provide certain advantages over diffused type resistor element. For example, thin film resistor elements do not consume valuable substrate surface area and the packing density of active circuit components is increased; they can be fabricated with greater precision, independently of the active circuit components. They are less temperature sensitive and they exhibit a wider resistance range. The technological need for thin film materials, the properties of which compare favorably with that of the bulk material, has spurred the investigation of numerous deposition techniques.

Metallic films suitable for defining thin film resistor elements have been formed by evaporation and by sputtering processes. Evaporation and sputtering processes exhibit a common limitation, i.e., the inability to precisely control sheet resistivity and stability to thermal and electrical stress. The excellent characteristics of bulk Nichrome resistors, have made this material the natural target for a thin film resistor technology. However, early experimentation to deposit films of NiCr demonstrated the difficulties inherent in achieving bulk properties in a thin film, reference is made to R. H. Adlerson et al., Brit. J. A. P. 8, 205 (1956), G. Siddall et al., Brit. J. A. P., 12, 668 (1961) and I. H. Pratt, Proc. of National Electronics Conf., vol. 20, p. 215 (1964).

U.S. Patent No. 3,400,066 describes a method for sputtering thin film Nichrome resistors in which sheet resistivity is precisely controlled. However, it has been found that in order to render the resistors stable to heat and electrical stress, it is necessary to thermally age the resistors and to adjust them to a predetermined value of resistance by another anodization step.

A sputtering process for the deposition of tantalum thin film resistors has been described, for example, in "Electrical Properties of Sputtered Tantalum Films" by L. I. Maissel, Ninth National Vacuum Symposium, 1962 sponsored by the American Vacuum Society, p. 169. In such process the tantalum films were deposited in a sputtering atmosphere comprising argon and oxygen. Reasonably stable resistive films were obtained after a subsequent aging process. However, it was reported that the exact amount of resistance increased during the stabilization test was found to vary considerably, both within a run and particularly from run to run. Further, such films were found to have large negative temperature coefficients and inferior high frequency characteristics. In addition, they were subject to large variations in sheet resistivity. The author concluded that instability of tantalum films was due to the presence of oxygen in the sputtering atmosphere.

Similarly, F. Vratny et al., Journal of the Electrical Chemical Society, vol. 112, No. 5, May 1965 discloses a technique for depositing tantalum thin films by AC sputtering and in the presence of an argon-oxygen atmosphere. As in the above Maissel reference, tantalum films prepared in the presence of oxygen were found to be unstable to heat and electrical stress and to have large negative temperature coefficients of resistance. In none of the above studies was there particular attention paid to the residual gas background during a sputtering, and its possible effect on the results obtained.

Among the requirements that are imposed upon thin film resistor elements when used in high speed circuits, is that they be stable to thermal and electrical stress. To satisfy such requirements, a process must therefore provide reproducible thin film resistors formed of appropriate alloy material, e.g., nickel-chromium alloys and be stable such that the resistance changes less than 1% over long periods of time in the presence of thermal and electrical stress.

SUMMARY OF THE INVENTION

This invention provides a process whereby enhanced stability can be achieved in thin film resistors without resort to post-deposition stabilization heat treatment and/or careful passivation in order to achieve some degree of stability. The process is achieved by a sputtering technique in which a negative DC bias potential is applied to the substrate receiving the metallic thin film. Sputtering is accomplished in an atmosphere comprising a pre-determined mixture of argon and oxygen. Thin film resistors prepared under the conditions set forth in the invention have shown changes of less than ½%, for up to 5000 hours of aging under accelerated testing conditions.

OBJECTS OF THE INVENTION

Accordingly, an object of this invention is to provide a process for fabricating thin film resistor elements which are stable to thermal and electrical stress.

Another object of this invention is to provide an improved sputtering process for depositing thin film resistor elements formed of alloy materials which are stable to thermal and electrical stress.

Yet another object of the invention is to provide an improved sputtering process for depositing thin film resistor elements formed of Nichrome alloys which are stable to thermal and electrical stress and which approach bulk resistivity.

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figure 1:
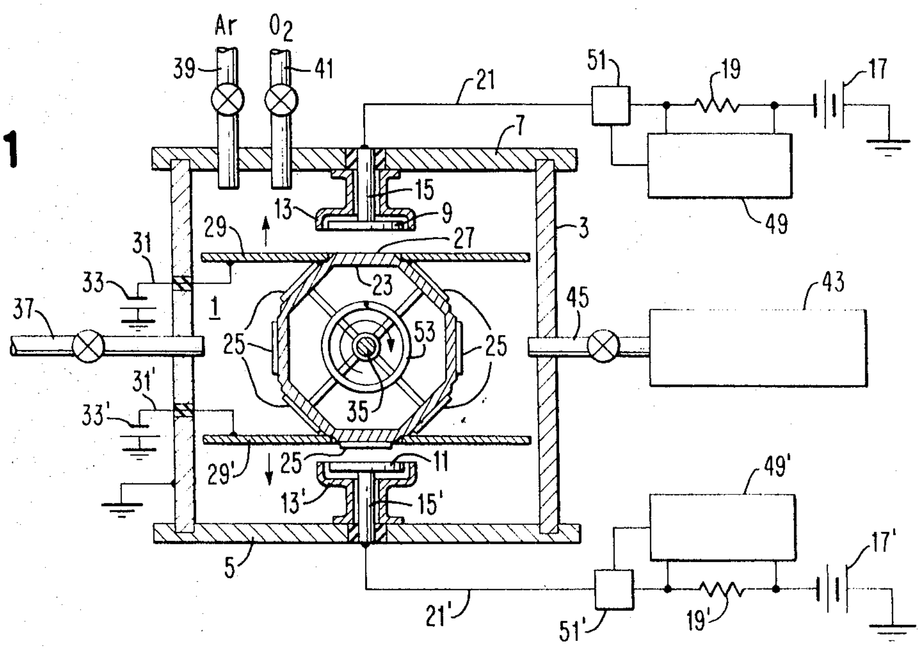
FIG. 1 is a cross-sectional view of a sputtering system embodying the principles of this invention.

Referring to FIG. 1, a dual cathode DC sputtering apparatus is shown as comprising a sputtering chamber 1 including a cylindrical member 3 supported within appropriate recesses contained in lower and upper plate members 5 and 7. Cylindrical member 3 and plate members 5 and 7 when joined define a high vacuum chamber capable of maintaining pressures of the order of $10^{-8}$ torr or better. Cylindrical member 3 and also plate members 5 and 7 are formed of metallic material and are maintained at ground potentials to serve as an anode during the deposition process.

A first target structure 9 is supported from upper plate member 7 and within a shield member 13 by conductive post 15; and a second target structure 11 is supported from lower plate member 5 and within a shield member 13' by conductive post 15'. Posts 15 and 15' extend through effective vacuum seals in upper and lower plate members 7 and 5 respectively. As shown, the respective planar surfaces of targets 9 and 11 are registered and in parallel planes. Targets 9 and 11 respectively, are connected to high voltage sources 17 and 17' i.e., in the range of −1000 volts to −5000 volts, along dropping resistors 19 and 19' and leads 21 and 21' connected at post 15 and 15'.

As hereinafter described, precision resistors 19 and 19' are used to monitor ion charge ($I_c$) to targets 9 and 11, respectively, which provides an indication of depositant thickness *t* during the sputtering process.

Target 9 comprises the particular material from which thin film resistors are to be formed. In the described process target 9 is formed of 80–20 nickel-chromium alloy; target 11 is formed of a suitable contact metallurgy, e.g., aluminum, gold, etc. which is deposited as a protective layer over thin nickel-chromium layer without breaking the vacuum in chamber 1. Such protective layer prevents oxidation so as to facilitate etching of the thin nickel-chrome alloy layer. While 80–20 nickel-chromium alloy is described, it is evident that other suitable metals and alloy materials can be similarly employed, e.g., 76–18 nickel-chromium including small percentages of silicon and aluminum, 74–16 nickel-chromium alloy including small percentages of iron and silicon (Karma) and copper-nickel alloys (Manganin).

Rotatable rectangular structure 23 formed of conductive material is positioned intermediate targets 9 and 11, particular surfaces thereof being adapted to support and electrically contact substrate 25, upon which a nickel-chromium alloy film is to be deposited.

Substrates 25 are supported, in turn, adjacent targets 9 and 11 and spaced to support a glow discharge therebetween. Blank surface 27 of structure 23 does not support a substrate but rather is used during pre-sputtering of targets 9 and 11 to remove surface contaminants, e.g., oxidized layers and establish system equilibrium prior to actual deposition. The surfaces of substrates 25 not positioned adjacent targets 9 and 11 are protected by annular shutter elements 29 and 29' formed of conductive material. The interior edges of shutter elements 29 and 29' are received within recesses cut in the apexes of structure 23; exterior edges of shutter elements 29 and 29' are closely spaced with the interior surface of cylindrical member 3 to define distinct sputtering chambers. Shutter elements 29 and 29' respectively, are connected along leads 31 and 31' which extend through effective vacuum seals in cylindrical member 3 to negative voltage sources 33 and 33' utilized for substrate biasing. When shutter elements 29 and 29' contact structure 23, substrates 25 are biased say at about −70 volts to about −250 volts. During deposition, only substrates 25 positioned adjacent targets 9 or 11, are exposed to sputter target materials, whereas remaining substrates 25 are protected. Shutter elements 29 and 29' are movable in a vertical direction as indicated by arrows to allow rotation of structure 23 about shaft 35 and successive positioning of substrates 25 adjacent targets 9 and 11, respectively.

The interior of chamber 1 is connected along valve duct 37 to a high efficiency vacuum pump system (not shown) capable of reducing pressures therein for example, in a range of $10^{-8}$ torr or better. Also, the interior of chamber 1 is connected to a source of sputtering gases, e.g., argon and also to a source of oxygen along valve ducts 39 and 41, respectively. During deposition, the partial pressure of oxygen is maintained at a predetermined level; in other words, the ratio of oxygen partial pressure and the sputtering atmosphere is particularly established prior to and maintained constant during the deposition process. The system is calibrated for a particular ratio of sputtering gases, i.e., argon and oxygen present in chamber 1. When the system of FIG. 1 is calibrated to a particular ratio $O_2/Ar$, total ion charge Q to a target 9 or 11 provides a direct indication of sputtering yield per incident, ion, and hence the thickness *t* of target material or depositant condensed on an adjacent substrate 25. To monitor the ratio $O_2/Ar$ a mass spectrometer 43 is connected along valve duct 45 to chamber 1. Subsequent to pre-sputtering, hereinafter described, and the introduction of sputtering gas, i.e., argon along valve duct 39, the ratio $O_2/Ar$ in chamber 1 is precisely measured and valve duct 41 is regulated to establish a pre-determined ratio $O_2/Ar$ for which the system has been calibrated. During deposition, the partial pressure of oxygen in chamber 1 does not vary whereby the ratio $O_2/Ar$ is maintained. Accordingly, the contribution of oxygen ions to the ion charge $I_c$ at targets 9 and 11, respectively and hence, sputtering yield per incident, ion, is known.

Initially, pressure within chamber 1 is reduced to $5\times10^{-8}$ torr or less to minimize the effects of residual active gases such that a deposited metallic layer exhibits a bulk resistivity substantially equal to that of the alloy materials forming target 9. A titanium sublimation pump, (not shown) is used continuously to maintain a clean ambient.

The sputtering process herein disclosed is similar to that described by L. Maissel et al., "Thin Films Deposited by Bias Sputtering," Journal of Applied Physics, vol. 36, No. 1, January 1965, wherein DC substrate biasing is utilized during deposition. DC substrate biasing during the deposition process subjects substrate 25 adjacent target 9 to a low energy bombardment by positive ions which dislodge absorbed impurities and thus provide purer films. In prior art processes, contaminants originating on target 9 and also present within chamber 1, would tend to increase the bulk resistivity of a deposited thin metallic film. Since the quality of contaminants varied in uncontrolled fashion, the resistivity of the deposited thin metallic film was not reproduced. Bulk resistivity is the ideal resistivity of a pure metal or solvent in an alloy material, and is the residual resistivity due to the presence of contaminants or solute in an alloy material. In the case of pure metals, bulk resistivity is approximately equal to the ideal resistivity. Hence, the residual resistivity reduces to zero in the ideal case. Since the ideal resistivity is highly temperature dependent, thin film resistor elements formed of pure metals exhibit a high temperature coefficient of resistance which precludes their useful application. For high speed integrated circuits, the temperature coefficient of resistance of a thin film resistor element is preferably less than 100 p.p.m./° C. whereby the change in total resistivity is less than 1% over a temperature range between say 0° C. to 100° C. Since residual resistivity is not temperature dependent, thin film resistor elements formed of alloy materials are preferred as they exhibit a lower temperature coefficient of resistance which is substantially constant to obtain reproducible bulk resistivity in thin metallic films formed of alloy materials. It is necessary that the composition of such films, i.e., contaminant level be precisely controlled and faithfully reproduce the target material.

Figure 2:
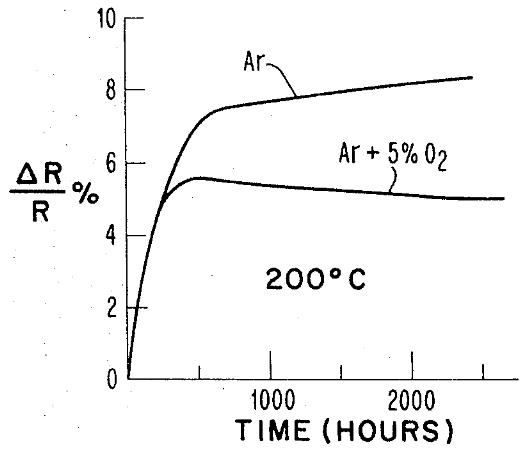
FIG. 2 is a curve illustrating the change of resistance with time of thin film resistors prepared in a sputtering atmosphere of argon alone and in an atmosphere containing argon and oxygen and without a DC bias potential applied to the substrate.
Figure 3:
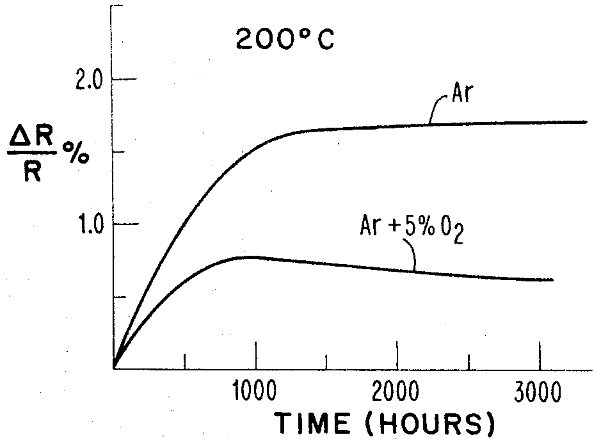
FIG. 3 is a curve illustrating the variation of resistance with time of thin film resistors prepared as in FIG. 2 except that a DC bias potential is applied to the substrate.

In addition to obtaining reproducible bulk resistivity in thin metallic films, it is also necessary that these films be stable to thermal and electrical stress. Film stability is expressed as the ratio $\Delta R/R$. When thin film resistors are prepared in an argon sputtering atmosphere, without DC biasing of the substrate, and such resistors are stored at a temperature of 200 C. in air, the device resistance increases continuously with time (as seen in FIG. 2). On the other hand, when these thin film resistors are prepared in a sputtering atmosphere of argon and about 5% oxygen and stored under similar conditions, the device resistance reaches a plateau and then proceeds to decrease in a relatively short time period thus indicating the improvement of resistance stability. In FIG. 3 thin film resistors are again prepared in atmospheres of pure argon, and in argon plus 5% oxygen, but having a DC bias potential impressed across the growing film during deposition of about −150 volts, as in the present invention, it is seen that resistance of the resistors are considerably lower than that shown in FIG. 2 which were prepared without biasing. Again, it is seen that the ratio $\Delta R/R$ of the resistors prepared in an atmosphere of argon and 5% $O_2$ reach a plateau and proceed to decrease at a relatively shorter period of time and attains constancy in a relatively short period of time when stored at 200° C. in air.

On the other hand, those resistors prepared in a pure argon atmosphere, do not reach a plateau, $\Delta R/R$ (see FIGS. 2 and 3) is seen to continuously increase. The deposition of thin film resistors in the presence of oxygen to obtain stability is antithetical to the published prior art. For example, as indicated in the above publication to L. I. Maissel, supra, it is shown that the presence of oxygen is detrimental to the stability of the resistor In order to overcome the defects of oxygen the author indicates that a noble metal such as gold or silver should be present in the lattice of the deposited metal to avoid occlusion of oxygen therein.

In accordance with the preferred method of this invention, stable precision thin film resistors are deposited by sputtering techniques wherein (1) system pressures within chamber 1 are initially reduced, say, to $5\times10^{-8}$ torr to substantially eliminate residual active gases affecting residual resistivity of thin metallic film; (2) presputtering the target to establish equilibrium conditions within chamber 1 to insure that the composition of the thin metallic film is identical to that of target structure 9; (3) applying a DC bias potential across the substrate upon which the metal film is to be deposited and applying it to the metal film to dislodge absorbed impurities thereby providing pure films; and (4) providing a sputtering atmosphere consisting of argon with a partial pressure of about 1% to about 10% oxygen, to effect film stability without requiring a subsequent post deposition stabilizing heat treatment and/or careful passivation in order to achieve some degree of stability.

To effect the process of this invention substrates 25 are established within chamber 1. The substrate may be thermally oxidized silicon wafers. These wafers are ultrasonically cleaned in a potassium dichromate cleaning solution. A metal ring or edge metallization is applied around the periphery of the substrate by sputtering or evaporating a metal or metal alloy such as molybdenum, Nichrome, etc. This ring is applied in order to insure that the DC potential applied to the substrate will be found on the surface of the growing film. The substrates 25 are loaded into the sputtering chamber 1 by spring clips (not shown) which are arranged so that substrates are held down near the edge metallization so that when the bias is applied, it would also be applied to the growing film. Chamber 1 is evacuated along valved duct 37 in excess of $5\times10^{-8}$ torr. During evacuation of chamber 1 degassing is effected by energizing heating coil 53 to elevate the temperature of structure 23 and also substrate 25 at least in excess of 200° C. When degassing and final system pressures are achieved, substrates 25 are maintained at a predetermined temperature e.g., 150° C. and chamber 1 sealed along valved duct 37. A titanium sublimation pump (not shown) is used continuously to maintain a clean ambient.

A sufficient partial pressure of high purity argon premixed with a predetermined amount of oxygen, e.g., 5% oxygen, is introduced along the valved duct 39 into chamber 1 to maintain a glow discharge, e.g., 20 to 40 microns. The substrates 25 are pre-sputtered by applying a cathode potential at targets 9 and 11 from voltage sources 17 and 17′ The cathode potential is about 2000 volts and has a current of 100 milliamps. The pressure in chamber 1 is between 20 to 40 microns and a bias of −100 volts is applied to substrates 25, pre-sputtering is continued for about 30 minutes. The blank surfaces 27 of structure 23 is positioned adjacent to target 9 and shutter elements 29 and 29′ are returned to current connect source 33 whereby structure 23 along with substrates 25 are biased at −180 to −150 volts. When switch 51 is activated, a glow discharge is struck and target 9 is subject to a high energy positive ion bombardment. The exterior portions of target 9 are sputtered for time sufficient, e.g., 30 to 60 minutes, to achieve system equilibrium whereby thin metallic film 47 faithfully reproduces the composition of the target material During this time, substrates 25 are protected from material being sputtered from target 9 by shutter elements 29 and 29′.

When target structure 9 has been conditioned, the glow discharge is extinguished by opening switch 51 and shutter elements 29 and 29′ are displaced to allow rotation of structure 23 by means (not shown) external of chamber 1 to position substrates 25 adjacent target structure 9. When substrates 25 are conditioned, a glow discharge is again struck by actuating switch 51 to bias target structure 9. At this time sputtered target material is deposited over the surface of substrates 25 as metallic film 47. When the diameter of target 9 is large, e.g., 6 inches compared to that of substrate 25, eg., 3 inches and the station therebetween is small, eg., 1.5 inches, the uniformity of deposited thickness is in the order of ±1%. The initial pumpdown of chamber 1 and also substrate biasing and temperature control result in thin metallic film 47 exhibiting a bulk resistivity substantially that of the target material. The thin metallic films are found to be stable under 200° C. storage as indicated in FIG. 3. Thus no post deposition stabilizing heat treatment and/or passivation is necessary to achieve stability of thin metallic films Integrated circuitry in which thin film resistor elements are defined may be prepared by conventional photolithographic processes.

What has been described above is a method for preparing thin film resistors which are stable under thermal and electrical stress without the requirement of a post-deposition stabilizing heat treatment or a passivation treatment. It is fundamental that in the prior art thin film processes, the presence of oxygen is deleterious to most desirable physical properties of the film. It has been found here however, that a judicious combination of substrate bias in oxygen partial pressure serves to enhance film stability.

While the invention has been shown and described with respect to a DC biasing sputtering process, it will be understood by those skilled in the art that various changes in form and detail may be made therein without departing from the spirit and scope of the invention. Particular aspects of the described invention are generally applicable to ion bombarding processes, e.g., RF sputtering, reactive sputtering, etc., for depositing metallic or nonmetallic layers. The initial pump-down of the system as hereinabove described, eliminates active residual gases whereby contamination of depositant layers is substantially eliminated.

What is claimed is:

1. A process for preparing a thin film resistor, said thin film resistors being stable to thermal and electrical stress, comprising the steps of:

(a) positioning a target of resistive material and a substrate within a chamber, (b) evacuating said chamber to a pressure between $1\times10^{-7}$ ton and $1\times10^{-10}$ ton, and introducing into said chamber a gaseous sputtering atmosphere at a pressure of about 20 to 40 microns;

said gaseous sputtering atmosphere being a predetermined mixture of Ar with about 1 to 10% $O_2$, (c) striking a glow discharge to said target whereby said target is sputtered and said resistive material is deposited on said substrate as a thin metallic film, (d) applying a negative DC bias potential of about 70 to —250 volts across said resistive material on said substrate during the deposition of said resistive material, (e) the above steps being carried out in the absence of a post-deposition stabilizing heat treatment or a passivation treatment.

2. The process of claim 1 including the further step of conditioning said target by striking a glow discharge to said target while shielding said substrate for a time sufficient to establish equilibrium conditions for the deposition of said resistive material on said substrate.

3. The process of claim 1 including the further step of maintaining said substrate at an elevated temperature of about 100° C. to about 200° C. during deposition of said thin films.

4. The process of claim 1 including the further step of: forming said target of a nickel-chromium alloy.

5. The process of claim 1 including the further step of:

providing a substrate having a conductive material deposited about its periphery.

6. The process of claim 1 including the further step of: photolithographically defining a predetermined pattern of said deposited material on said substrate.

References Cited

UNITED STATES PATENTS

| | | | |
|---|---|---|---|
| 3,400,066 | 9/1968 | Caswell et al. | 204—192 |
| 3,451,912 | 6/1969 | D'Heurle et al. | 204—192 |

OTHER REFERENCES

Maissel et al.: "Thin Films Deposited by Bias Sputtering," J. of App. Phy., vol. 36, No. 1, January 1965.

HOWARD S. WILLIAMS, Primary Examiner

S. S. KANTER, Assistant Examiner